United States Patent [19]

Hayashi et al.

[11] 4,110,160

[45] Aug. 29, 1978

[54] FUEL ASSEMBLY SPACER WITHIN THE COOLANT DUCT

[75] Inventors: Kiyozumi Hayashi, Toride; Takeo Ohta, Sagamihara; Tetsuo Kobori, Mito, all of Japan

[73] Assignee: Doryokuro Kakunenryo Kaihatsu Jigyodan, Tokyo, Japan

[21] Appl. No.: 791,147

[22] Filed: Apr. 26, 1977

[30] Foreign Application Priority Data

Apr. 26, 1976 [JP] Japan .................................. 51-52279

[51] Int. Cl.² .............................................. G21C 3/30
[52] U.S. Cl. ......................................... 176/78; 176/76
[58] Field of Search .............................. 176/68, 76, 78

[56] References Cited

U.S. PATENT DOCUMENTS

| | | | |
|---|---|---|---|
| 3,431,171 | 3/1969 | Glandin | 176/78 |
| 3,442,763 | 5/1969 | Chetter et al. | 176/78 |
| 3,607,640 | 9/1971 | Krawiec | 176/78 |
| 3,654,077 | 4/1972 | Lass et al. | 176/78 |
| 3,674,638 | 7/1972 | McGregor | 176/78 |
| 3,679,546 | 7/1972 | Muellner et al. | 176/78 |
| 3,697,375 | 10/1972 | Suvanto et al. | 176/78 |
| 3,702,803 | 11/1972 | Huebotter | 176/78 X |
| 3,746,617 | 7/1973 | Iwao et al. | 176/78 |
| 3,751,335 | 8/1973 | Keith | 176/78 |
| 3,767,525 | 10/1973 | Selm et al. | 176/78 X |
| 3,816,247 | 6/1974 | Cayol et al. | 176/78 |
| 3,932,216 | 1/1976 | Jabsen | 176/78 |

Primary Examiner—Peter A. Nelson

[57] ABSTRACT

A fuel assembly spacer for a nuclear reactor, the spacer having a plurality of spring with a uniform spring strength and arranged symmetrically around the outer periphery of the spacer so that the fuel assembly can be coaxially disposed with respect to a coolant duct. This spacer serves to maintain as uniform a gap as possible between the inner wall of the coolant duct and each outermost fuel rod in the fuel assembly so that the flow of the coolant keeps it symmetry in the section of the coolant duct, thereby improving the thermal performance of the fuel assembly.

7 Claims, 7 Drawing Figures

FUEL ASSEMBLY SPACER WITHIN THE COOLANT DUCT

BACKGROUND OF THE INVENTION

This invention relates to a construction of a fuel assembly spacer used for various nuclear power reactors of the type where the fuel assembly is inserted in a coolant duct and, more particularly, to a fuel assembly spacer which has a plurality of springs having a unit for spring strength and arranged around the outer periphery of the spacer so that the fuel assembly can be positioned coaxially with the coolant duct.

In the design of a nuclear power reactor, in which the heat produced from the nuclear fuel is transmitted to a coolant, as the criterion for evaluation of the soundness of the fuel at the present it is necessary to provide sufficient heat removal capacity lest burn-out of fuel should result. Considerations in this respect should also be given to the design of the spacer. The basic function of the spacer is to keep the gap between adjacent fuel rods at a prescribed value so as to prevent formation of hot spots, either thermal or radioactive. Also, it should not unduly interfere with the flow of the coolant contributing to the removal and transmission of heat from the fuel, and also it is required to have sufficient strength to reliably hold the fuel rods in their normal positions even against vibrations due to the flow force of the coolant, thermal bending due to non-uniform thermal distribution in the fuel rods and other stresses due to external loads.

However, results of recent research reveals that the performance of removal of heat from the fuel by the coolant is greatly influenced by such factor as the contour of the fuel assembly including the spacers. Particularly, where a channel tube or a pressure tube is used as an outer structure of a fuel assembly constituting a duct for the passage of a coolant, there is some tolerance in the cross-sectional demension of the coolant duct during its manufacture, and also the sectional area of the duct tends to increase due to the secular creep deformation caused by stresses produced during use of the reactor and by irradiation with neutrons. Therefore, the effects of the positional contour of the fuel assembly within the coolant duct during the thermal performance of the fuel cannot be ignored.

However, the design of the conventional spacers has been made mainly from the standpoint of the structural strength, and the aforementioned effects of the contour of the fuel assembly including the spacers during the heat removal performance have not been taken into detailed consideration.

SUMMARY OF THE INVENTION

In the light of the foregoing, an object of the invention is to provide a fuel assembly spacer for various types of nuclear power reactors where the fuel assembly is inserted in a coolant duct.

Another object of the invention is to provide a fuel assembly spacer which prevents eccentricity of the fuel assembly in the coolant duct which ordinarily would result from the combination of dimensional tolerance at the time of manufacture and secular dimensional changes, to thereby improve the removal of heat by the coolant.

A further object of the invention is to provide a fuel assembly spacer which can maintain as uniform a gap as possible between the inner wall of the coolant duct and each outermost fuel rod of the fuel assembly to maintain the symmetry of the flow of the coolant in a section perpendicular to; the coolant duct, thereby improving the thermal performance the fuel.

The invention provide a fuel assembly spacer which has a plurality of springs having uniform spring strength and arranged around its outer periphery in a symmetrical relation with respect to the periphery or axis of rotation. The above and other objects, features and advantages of the invention will become more apparent from the following description taken in conjunction iwth the accompanying drawings.

DETAILED DESCRIPTION OF THE INVENTION

As described above, the removal of heat from the fuel by the coolant is greatly affected by factors related to the contour of the fuel assembly including spacers. Of these contour factors, present invention concerns the eccentricity of the fuel assembly in a coolant duct. By the term "eccentricity of the fuel assembly" is meant a deviation a transverse the center of sectional plane of the fuel assembly with respect to the transverse center of a sectional plane of a coolant duct such as channel tube or pressure tube. If this eccentricity is present, the relative flow areas of sub-channels are different from the normal values for the fuel assembly causing unfavorable effects upon the sub-channel flows of the coolant. Particularly, in case of a boiling water cooled reactor, a great deviation of steam quality by weight is produced in the sectional area of each sub-channel.

Since in a water cooled reactor the burn-out phenomenon is a linearly reducing function of the steam quality, that is, the burn-out heat flux is reduced with increase of the steam quality.

Figure 1:
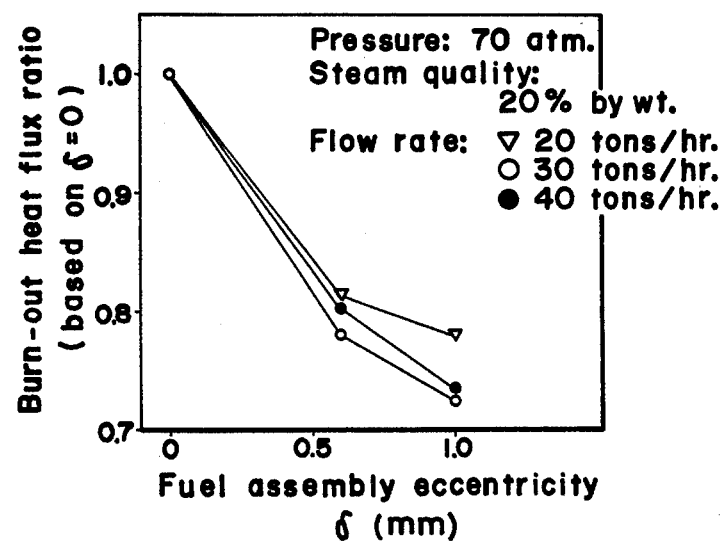
FIG. 1 is a graph showing the relation between burn-out heat flux ratio and the eccentricity of a fuel assembly in a pressure tube type reactor.

FIG. 1 shows the relation between the burn-out heat flux ratio and the eccentricity of a cluster type fuel assembly in a pressure tube of a pressure tube type reactor of the boiling water cooling type, the graph being obtained from experiments using a 14 megawatt heat transfer loop. These experiments were conducted under conditions wherein the dimensions of the inner diameter of the tested pressure tube was 117.8 mm and the outer peripheral diameter of the cluster type fuel assembly was 116.7 mm. The eccentricity was controlled by positioning the dummy fuel assembly for the burn-out test in the top enclosure of the 14 megawatt heat transfer loop. As is apparent from FIG. 1, the burn-out heat flux ratio is greatly reduced even for a slight eccentricity of the fuel assembly. Thus, it is important to hold the fuel assembly in the coolant duct in a position in which there is no eccentricity.

Figure 2:
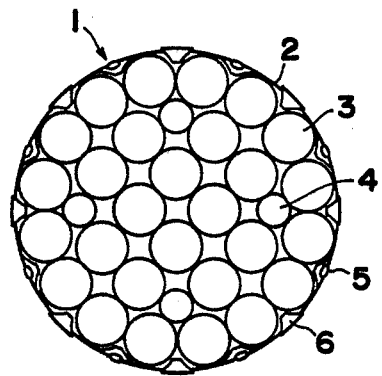
FIG. 2 is a plan view showing a cluster-type fuel assembly spacer embodying the invention.
Figure 3:
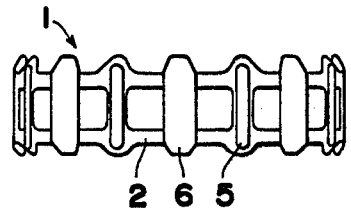
FIG. 3 is a side view of the spacer shown in FIG. 2.

FIGS. 2 and 3 show an embodiment of a fuel assembly spacer according to the invention. It is a cluster type fuel assembly spacer used for a pressure tube type reactor or the like. This spacer 1 comprises an annular outer member 2, and a number of fuel rod retainer rings 3 and reinforcing rings 4, these rings being provided inside the annular outer member. Also, it comprises eight stationary projections 5 and also eight projecting springs 6, these springs being arranged around the outer periphery of the annular member 2. The individual springs 6 all have substantially uniform spring strength and are uniformly spaced around the outer periphery of the spacer.

Figure 4A:
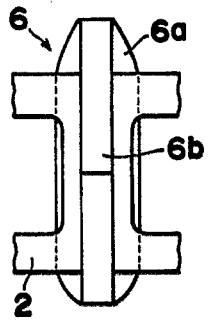
FIG. 4A shows the back of a spring on the spacer.
Figure 4B:
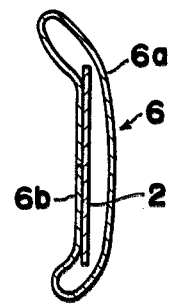
FIG. 4B is a sectional view of the spring on the spacer shown in FIG. 4A.

The details of the construction of each spring 6 are shown in FIGS. 4A and 4B. As is shown, it has an outer deformable slide portion 6a having a substantially arcuate convex sectional profile and inner portions 6b folded from the opposite ends of the outer portion. The ends of the opposite inner portions are butt welded to each other, and the welded portion is welded to the inner periphery of the annular outer member 2 of the spacer. The material of the spring can be metals as Inconel and stainless steel. In addition, in a boiling water cooled reactor, niobium dispersion type zirconium alloys, which absorb less thermal neutrons and which have excellent resiliency within the reactor operation temperature range, are suitable for the spacer material.

When a fuel assembly using spacers of the above described construction is inserted in a pressure tube, the deformable slide portions 6a thereof are uniformly deformed when they can in contact with the inner wall of the pressure tube by virtue of the uniform spring strength of the springs 6. In this way, the fuel assembly and pressure tube are naturally disposed in a true coaxial relation to each other. Further, the central portion of the pressure tube, with respect to its length, at which the reactor core is positioned receives higher flux of fast neutrons than the other portion of the pressure tube in the course reactor operation, and a so-called "belly" shape is formed in the pressure tube due to eventual increase of the inner diameter of the central portion of the pressure tube compared to portions thereof adjacent to its ends. And further, in case of refuelling a belly shaped pressure tube, a fuel assembly can be easily loaded through the narrow end portion of the pressure tube, because the deformable slide portions of 6a of the spacers accommodate themselves to the small inner diameter of the pressure tube.

Figure 5:
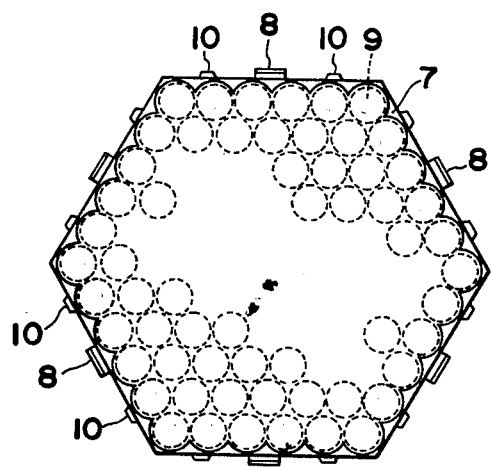
FIG. 5 is a plan view showing a hexagonal fuel assembly spacer for a liquid metal cooled reactor.
Figure 6:
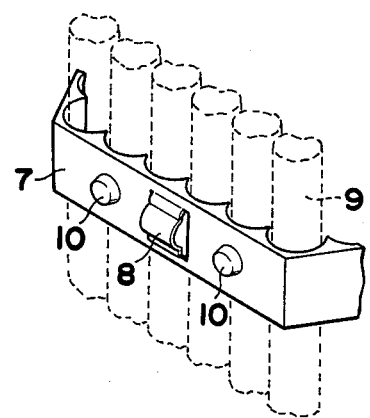
FIG. 6 is an enlarged, fragmentary, perspective view showing one side of the hexagonal outer periphery of the spacer shown in FIG. 5.

The invention can of course be applied to a liquid metal cooled reactor fuel assembly as well as to a boiling water cooled reactor fuel assembly as above-described. The fuel assembly used in a liquid metal cooled reactor usually has a hexagonal lattice arrangement of fuel rods having an outer diameter of 4 to 6 mm such that a hexagon is formed by the outermost fuel rods. In this case, a channel tube or wrapper tube forming the outer side structure of this fuel assembly also has a hexagonal sectional profile. Thus, as shown in FIGS. 5 and 6, the outer member 7 of the fuel assembly spacer of the aforementioned type also has a hexagonal shape. Again in this case, springs 8 having uniform spring strength are provided on the outer periphery of the outer member 7 at symmetrical positions thereof to maintain a uniform gap between the inner wall of the wrapper tube (not shown) and the outermost fuel rods 9 of the fuel assembly, whereby it is possible to improve the removal of heat for the fuel rods by the liquid metal coolant from the reasons set forth above.

In the embodiment shown in FIGS. 5 and 6, each side of the hexagonal outer periphery of the outer member 7 is provided with a spring 8 at the middle portion of the lenght of each side and two rigid projections 10 on opposite sides of the spring 8. The spring is punched out to form a deformable slide portion having a substantially arcuate convex sectional profile. The deformable slide portion 8 has two slits on either side thereof.

While the invention has been described in some detail in conjunction with its most preferred embodiments, it is apparent that various changes and modifications can be made without departing from the scope and spirit of the invention and that the invention covers any possible form of structure that falls within the scope of the annexed claims.

What is claimed is:

1. A spacer for a nuclear fuel assembly for positioning in a coolant duct through which coolant flows to remove heat generated in nuclear fuel elements during the operation of a nuclear reactor, said spacer comprising a structure for holding a plurality of fuel elements and a plurality of projecting springs having uniform spring strengths disposed symmetrically around the outer periphery of said spacer structure, said springs in their fully expanded condition extending beyond the peripheral dimension of the maximum inner diameter of said coolant duct reached during the course of reactor operation, whereby as uniform a gap as possible is formed between the inner wall of the coolant duct and the outer surface of the spacer structure when the spacer structure with fuel elements therein is positioned in the coolant duct and symmetry of the flow of the coolant in the section of the coolant duct is maintained even if there is an eventual increase of the inner diameter of the coolant duct during the course of reactor operation.

2. The spacer according to claim 1, in which said spacer structure has an annular member, a plurality of fuel rod retainer rings and reinforcing rings mounted within said outer annular member, and said springs are spaced at equal intervals along the outer periphery of said outer annular member.

3. The spacer according to claim 2, which further comprises a plurality of stationary projections on said outer annular member, said stationary projections and said springs being alternately positioned along the outer periphery of said outer annular member and spaced at equal intervals.

4. The spacer according to claim 2, wherein each of said springs has an outer deformable slide portion having a substantially arcuate convex sectional profile and inner portions folded from the opposite ends of said outer portion, the ends of said inner portions being butt welded each other, the welded portion being welded to the inner periphery of said outer annular member.

5. The spacer according to claim 1, wherein said springs are of a metal taken from the group consisting of Inconel and stainless steel.

6. The spacer according to claim 1, in which said springs are made of a niobium dispersed type zirconium alloy, whereby said spacer is particularly useful for a fuel assembly for a boiling water cooled type reactor.

7. The spacer according to claim 1 in which said spacer has a hexagonal outer member, said plurality springs being on the outer periphery of said outer member at symmetrical positions thereof, whereby said spacer is particularly useful for a fuel assembly for a liquid metal cooled type reactor using a hexagonal fuel assembly having a hexagonal lattice arrangement of fuel rods in which the outermost fuel rods form a hexagon, said hexagonal fuel assembly being for insertion into a hexagonal wrapper tube.

* * * * *